P. W. FORSBERG.
ELECTRICAL SYSTEM OF POWER TRANSMISSION AND REGENERATIVE BRAKING.
APPLICATION FILED OCT. 29, 1917.
1,315,826.  Patented Sept. 9, 1919.
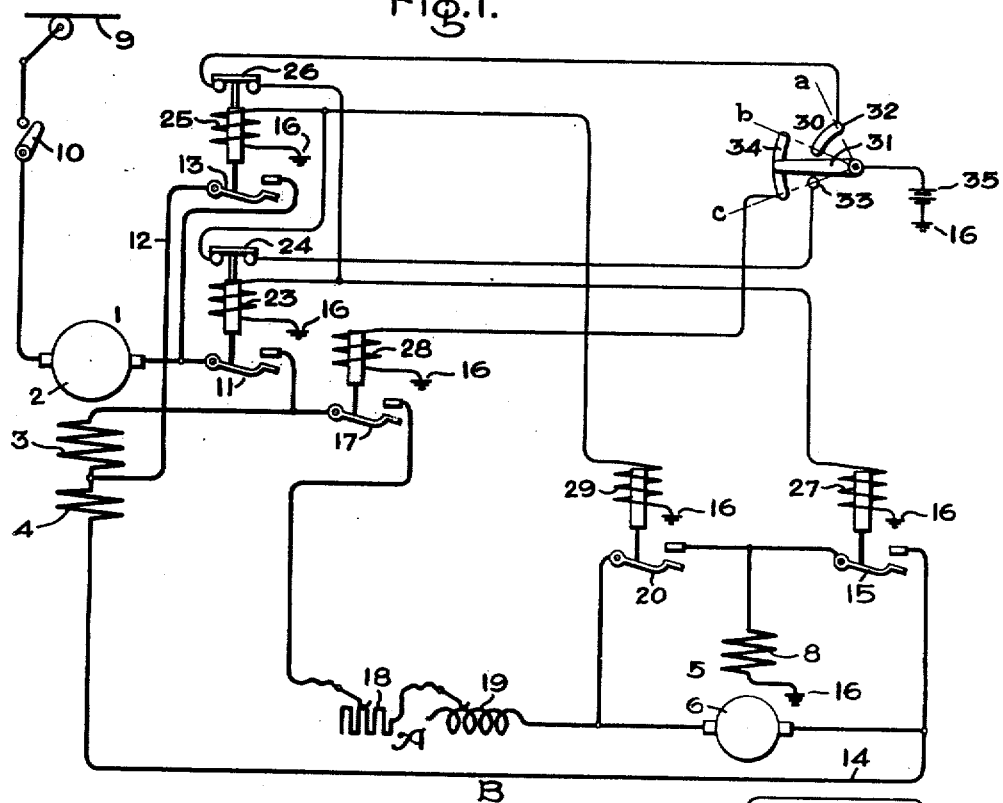
Fig. 1.
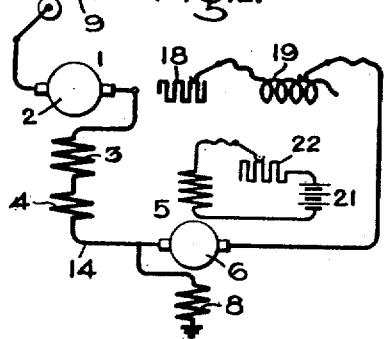
Fig. 2.
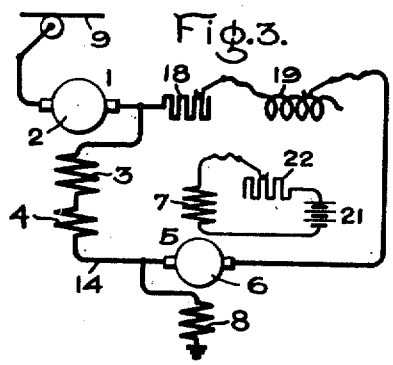
Fig. 3.
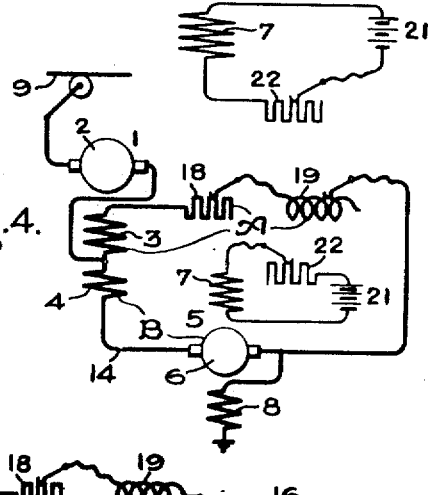
Fig. 4.
Fig. 5.
Inventor:
Peter W. Forsberg,
by
His Attorney.

UNITED STATES PATENT OFFICE.

PETER W. FORSBERG, OF SCHENECTADY, NEW YORK, ASSIGNOR TO GENERAL ELECTRIC COMPANY, A CORPORATION OF NEW YORK.

ELECTRICAL SYSTEM OF POWER TRANSMISSION AND REGENERATIVE BRAKING.

1,315,826.      Specification of Letters Patent.      Patented Sept. 9, 1919.

Application filed October 29, 1917. Serial No. 198,995.

*To all whom it may concern:*

Be it known that I, PETER W. FORSBERG, a citizen of the United States, residing at Schenectady, in the county of Schenectady, State of New York, have invented certain new and useful Improvements in Electrical Systems of Power Transmission and Regenerative Braking, of which the following is a specification.

My invention relates to electrical systems of power transmission and regenerative braking and particularly to systems comprising a dynamo-electric machine, having an armature and a series field winding, and means, for reversing the connections between said armature and series field winding, to cause said dynamo-electric machine to operate as a motor to drive a mechanical load, to which it is connected, or to operate as a generator to brake said load.

In a system of the kind to which my invention relates it has been proposed to connect a source of voltage in shunt to the series field winding of the dynamo-electric machine, during the generator operation thereof, in order partially to correct for the inherent instability of the dynamo-electric machine, when the voltage of the power circuit, to which it delivers current, fluctuates, or when the speed at which it is driven varies. Notwithstanding the stabilizing action of a source of voltage connected in the manner indicated, sudden changes in the voltage of the circuit, to which the dynamo-electric machine is delivering current, and, to a lesser extent, rapid changes in the speed at which said machine is driven may cause objectionable rushes of current, flashing over at the brushes of said machine and other harmful effects.

The object of my invention is to provide means, in a system of the kind referred to, whereby the operation of the dynamo-electric machine as a generator will be stable and the system be protected from harmful disturbances, notwithstanding fluctuations in the relation between the voltage generated by said dynamo-electric machine and the voltage of the circuit to which said machine is delivering current, whether such fluctuations are caused by variations in the voltage of said circuit or by variations in the speed of said machine.

In accordance with my invention, I provide the dynamo-electric machine with a main field winding and an auxiliary field winding which are adapted, during the generator operation of the dynamo-electric machine, to be connected in individual parallel circuit portions by one or both of which the current generated by said machine is carried, said auxiliary field winding being adapted, when traversed by current generated by said dynamo-electric machine, to develop an M. M. F. opposing that developed by the main field winding. In the circuit portion in which the auxiliary field winding is connected I may also serially connect a source of voltage, such as a battery or exciter. In case an exciter be employed, it may be provided with a main field winding and an auxiliary field winding adapted to be traversed by the current generated by said dynamo-electric machine and when traversed by the current generated by said dynamo-electric machine to act differentially with respect to said main field winding. In the circuit portion in which the main field winding is connected I may also serially connect an ohmic resistance or a reactance, or both an ohmic resistance and a reactance, which may be made adjustable if desired.

My invention may best be understood by reference to the accompanying drawings, in which: Figure 1 is a diagrammatic view of a system embodying one modification of my invention; Fig. 2 is a simplified diagram of the connections which obtain during one period of the motoring operation of the dynamo-electric machine; Fig. 3 is a simplified diagram of the connections which obtain during another period of the motoring operation of the dynamo-electric machine; Fig. 4 is a simplified diagram of the connections which obtain during the generator operation of the dynamo-electric machine; and Fig. 5 is a simplified diagram of the connections which obtain during the generator operation of the dynamo-electric machine in a system in which a storage battery is substituted for the exciter which is employed in the system of Fig. 1.

Referring to Fig. 1: 1 represents a dynamo-electric machine, having an armature 2, a main field winding 3 and an auxiliary field winding 4. 5 represents an exciter having an armature 6, a separately excited main field winding 7, and an auxiliary field winding 8. One side of the armature 2 of the dynamo-electric machine 1 is adapted to be connected to the trolley line 9 by means of the switch 10. The other side of the armature 2 is adapted to be connected to one terminal of the main field winding 3 by means of the contactor 11 or to the other terminal of the field winding 3 which is connected to one terminal of the auxiliary field winding 4 by means of a conductor 12 and a contactor 13. The terminal of the auxiliary winding 4, which is not connected to the winding 3, is connected to one side of the armature 6 of the exciter 5, by means of the conductor 14, and is adapted to be connected by means of the contactor 15 to one terminal of the auxiliary field winding 8, the other terminal of which is connected to ground 16. The terminal of the field winding 3, which is not connected to the field winding 4, is adapted to be connected by means of the contactor 17, through the adjustable resistance 18 and the adjustable reactance 19 to the side of the armature 6 opposite to that to which the conductor 14 is connected, and is adapted to be connected by means of the contactor 20, to the ungrounded terminal of the field winding 8. The field winding 7 of the exciter 6 is adapted to be variably excited by means of the source of current 21 and the adjustable resistance 22. The contactor 11 is operated by means of an operating winding 23 and is provided with an interlocking switch 24. The contactor 13 is adapted to be operated by means of an operating winding 25 and is provided with an interlocking switch 26. The contactor 15 is adapted to be operated by means of an operating winding 27. The contactor 17 is adapted to be operated by means of an operating winding 28. The contactor 20 is adapted to be operated by means of an operating winding 29. The energization of the operating windings of the contactors 11, 13, 15, 17 and 20 is controlled by the controller 30, comprising a movable controller arm 31, and stationary contacts 32, 33 and 34. The movable controller arm 31 is connected, through a source of current 35, to ground 16. The operating winding 23 of the contactor 11 and the operating winding 27 of the contactor 15 are connected, by means of the interlocking switch 26, associated with the contactor 13, to the stationary contact 32 of the controller 30 and to ground 16. The operating winding 25 of the contactor 13 and the operating winding 29 of the contactor 20 are connected, by means of the interlocking switch 24, associated with the contactor 11, to the stationary contact 33 of the controller 30 and to ground 16. The operating winding 28 of the contactor 17 is connected to the stationary contact 34 of the controller 30 and to ground 16. By reason of the interlocking switch 24, the contactors 13 and 20 can be closed only when the contactor 11 is open, and likewise, by reason of the interlocking switch 26, the contactors 11 and 15 can be closed only when the contactor 13 is open.

When it is desired to operate the dynamoelectric machine as an ordinary series motor with the main field winding 3 and the auxiliary field winding 4 acting accumulatively, in other words, when it is desired to obtain the connections illustrated in Fig. 2, the switch 10 will be closed and the movable controller arm 31 of the controller 30 will be moved to the position indicated by the letter a, in which position the contactors 11 and 15 will be closed, since their operating windings 23 and 27 will be connected through interlocking switch 26, the stationary contact 32 of the controller 30 and the movable controller arm 31 to the source of current 35. With the contactors 11 and 15 closed, the connections illustrated in Fig. 2 will be obtained. The closing of the contactor 11 causes the opening of the interlocking switch 24 and renders it impossible to energize the operating windings of the contactors 13 and 20 until the contactor 11 is reopened.

If it be desired to cause the dynamoelectric machine 1 to change from motoring to generating, the movable controller arm 31 will first be moved to position b whereupon the operating winding 28 of the contactor 17 will be connected, by means of the stationary contact 34 and controller arm 31, to the source of current 35 and the contactor 17 will accordingly be closed. With contactors 11, 15 and 17 closed the connections, illustrated in Fig. 3, obtain. The resistance 22 will then be adjusted until the field windings 3 and 4 are superexcited to such an extent that the C. E. M. F. developed in the armature 2 of the dynamo-electric machine 1 balances the voltage of the power circuit, comprising trolley line 9 and ground 16, and the motoring current is reduced to zero. The movable controller arm 31 will then be moved to the position c, whereupon the operating windings of the contactors 11 and 15 will be deënergized and, upon the closing of the interlocking switch 24, the operating windings 25 and 29 of the contactors 13 and 20 will be energized, and hence the contactors 13 and 20 will be closed. The operating winding 28 of the contactor 17 in the meantime remains energized and hence the contactor 17 remains closed when the movable controller arm is moved from the position b to position c. Thus the movement of the controller arm 31 from the position b to c changes the connections from those illustrated in Fig. 3 to those illustrated in Fig. 4. The resistance 22 having been adjusted so that, with the connections illustrated in Fig. 3, the motoring current is equal to zero, the generated current will likewise be equal to zero when the connections, illustrated in Fig. 4, are obtained, providing the adjustment of the resistance 22, the voltage between the trolley line 9 and ground 16, and the speed of the armature 2 remain the same. Since the contactor 17 remains closed, in changing from motoring to generating, the circuit, including the field windings 3 and 4 and the armature 6 of the exciter 5, remains unbroken during such change and therefore the field of the dynamo-electric machine remains energized at all times.

When the dynamo-electric machine 1 is operating as a generator, connected as illustrated in Fig. 4, for certain values of the exciter armature voltage and of the current, generated by the dynamo-electric machine 1, hereinafter referred to as the regenerated current, the regenerated current will divide between parallel circuit portions, one of which comprises the reactance 19, the resistance 18 and the field winding 3, and will hereinafter be referred to as circuit portion A, and the other of which comprises the exciter armature 6 and the field winding 4, and will hereinafter be referred to as circuit portion B. For certain other values of the exciter armature voltage and regenerated current, all of the regenerated current will traverse circuit portion A and no current will traverse circuit portion B. For certain other values of exciter armature voltage and regenerated current, all of the regenerated current will traverse the circuit portion A and the exciter will cause a current to traverse a local circuit comprising the reactance 19, the resistance 18, the field winding 3, the field winding 4 and the exciter armature 6. The field winding 4 develops a magneto-motive-force opposing the magneto-motive-force of the field winding 3 when traversed by regenerated current and develops a magneto-motive-force assisting the magneto-motive-force of the field winding 3 when traversed by current which the exciter causes to traverse the above indicated local circuit in which it is included. It is contemplated that under normal conditions the operator will vary the resistance 22 so as to keep the value of the current traversing the circuit portion B approximately zero, although this is not necessary.

For the purpose of more readily explaining the operation of my invention, let $E_2$ represent the voltage developed in the armature of the dynamo-electric machine 1, $E_9$ represent the voltage of the power circuit to which the dynamo-electric machine is connected, $R_2$ represent the sum of the resistances of the armature 2 of the dynamo-electric machine 1, of the conductors extending from the armature to the trolley line 9 and of the conductors extending from the armature to the point at which the armature is connected to the field windings 3 and 4, I represent the regenerated current, $E_x$ represent the voltage between ground 16 and the point at which the armature is connected to the field windings 3 and 4. The relation of the several quantities referred to may then be expressed by the equation, $$E_x = E_2 - E_9 - IR_2,$$

the product $IR_2$ representing the voltage consumed between the point at which the armature 2 is connected to the field windings 3 and 4 and the point at which it is connected to the trolley line 9. Now if the voltage $E_9$ of the power circuit suddenly decrease, the voltage $E_x$ must necessarily increase, since, for the moment the voltage $E_2$ of the dynamo-electric machine and the product $IR_2$ remain substantially unchanged. Consequently, the voltage across each of the parallel circuit portions A and B will increase. By reason of the reactance 19 and the reactance of the field winding 3, an increase in the current in field winding 3 is retarded. If at the moment of decrease in the voltage $E_9$ no current is traversing the circuit portion B, the decrease in the voltage $E_9$ of the power circuit will cause regenerated current to flow in said circuit portion B and therefore an M. M. F. to be developed in the field winding 4 which opposes the M. M. F. of the field winding 3, thereby decreasing the field strength of the dynamo-electric machine 1 and consequently decreasing the voltage developed in the armature 2 thereof. If at the moment of the decrease in the voltage $E_9$, a portion of the regenerated current is traversing the circuit portion B, the decrease in the voltage $E_9$ of the power circuit will cause additional regenerated current to traverse said circuit portion B, thereby decreasing the field strength of the dynamo-electric machine 1 and consequently decreasing the voltage developed in the armature 2 thereof. If, at the moment of the decrease in the voltage $E_9$, all the regenerated current traverses the circuit portion A and the exciter is causing a current to traverse the local circuit, comprising the reactance 19, the resistance 18, the field winding 3, the field winding 4 and the exciter armature 6, the decrease in the voltage $E_9$ of the power circuit will result in a decrease in the current traversing the circuit portion B, and may even reverse the direction of the flow of current therein, thereby decreasing the field strength of the dynamo-electric machine 1 and consequently decreasing the voltage developed in the armature 2 thereof. The reduction of the voltage, developed in the armature 2 of the dynamo-electric machine 1, in the manner indicated, follows promptly upon a decrease in the voltage of the power circuit $E_9$. Subsequently, the current in the circuit portion A will build up and, while the effect of the increase in the current traversing the field winding 3 will be to increase the voltage developed in the armature 2, the auxiliary field winding 8, which is adapted to act accumulatively with respect to the main field winding of the exciter during the motoring operation of the dynamo-electric machine and to function as a differential field winding during the generator operation of said dynamo-electric machine, will have become effective to reduce the voltage of the exciter 5, thereby compensating, to the desired degree, for the effect of the increased regenerated current in the field winding 3 either by permitting an increased portion of the regenerated current to traverse the circuit portion B or by decreasing the current supplied by the exciter to the local circuit. The resistance 18 also has a current limiting effect since, when the regenerated current divides between the two parallel circuit portions A and B, it renders the resistance of the combined circuits greater than would be the case if it were omitted, thereby causing a greater portion of the voltage of the dynamo-electric machine to be consumed, and it also causes a greater portion of the regenerated current to be shunted through the circuit portion B thereby increasing the M. M. F. of the field winding 4 which oppose the M. M. F. of the field winding. When all the regenerated current traverses the circuit portion A, the resistance 18 reduces the regenerated current, and hence the current traversing the field winding 3, below what it would be in case it were omitted. When the exciter is causing a current to traverse the local circuit including field windings 3 and 4, the voltage drop across the resistance 18 due to the presence therein of the regenerated current and the current supplied by the exciter, subtracts from the voltage of the exciter thereby reducing the current supplied thereby to the field windings 3 and 4.

It is thus manifest that, upon a sudden decrease in the voltage of the power circuit, the voltage developed in the armature 2 of the dynamo-electric machine is promptly decreased, and the differential field winding 8 of the exciter 5 and the field winding 4 are effective to compensate, to the desired degree, for the subsequent increase in the current in the field winding 3.

Upon a sudden increase in the voltage of the power circuit, the voltage, developed in the armature 2 of the dynamo-electric machine, will be promptly increased and the differential field winding 8 of the exciter 5 and the field winding 4, which will then be cumulative with respect to the field winding 3 will be effective to compensate, to the desired degree, for the subsequent decrease in the current in the field winding 3. The reasons underlying the operation of my invention, when a sudden increase in the voltage of the power circuit occurs, are believed to require no further explanation inasmuch as it is thought that they will be evident upon a consideration of the explanation of the operation of my invention when a sudden decrease in the voltage of the power circuit occurs.

Although in the explanation of the operation of my invention, it has been assumed that the fluctuations, in the relation between the voltage generated by the dynamo-electric machine and the voltage of the power circuit, result from changes in the latter, nevertheless the operation is substantially the same if such fluctuations result from changes in the voltage of the dynamo-electric machine due to changes in the speed thereof except that it will be favorably modified by reason of the fact that the fluctuations due to speed changes occur less rapidly.

Referring to Fig. 5, in which elements corresponding to elements of the system of Fig. 1 are designated by the same reference characters, it will be noted that the connections shown therein correspond to the connections of the system of Fig. 1 which are shown in Fig. 4, and that the one difference, between the system of Fig. 5 and the system of Fig. 4, is that a battery 36 is substituted for the exciter 5.

The operation of the system illustrated in Fig. 5 is substantially the same as the operation of the system illustrated in Fig. 4 which has already been explained, except as it is modified by reason of the fact that the voltage of the battery 36 remains substantially unchanged when the regenerated current varies.

I conceive that various modifications of my invention may be made, and that my invention may be applied to systems other than those illustrated herein. Accordingly, I do not desire to be limited to the exact arrangement herein described and shown, but seek to cover in the appended claims all such modifications and arrangements as fall within the scope and spirit of my invention.

What I claim as new and desire to secure by Letters Patent of the United States, is:

1. The combination in a regenerative system, of a power circuit, a direct current dynamo-electric machine connected to operate as a generator and to deliver current to the power circuit, said dynamo-electric machine comprising an armature, a main series field winding and an auxiliary field winding, said main series field winding and said auxiliary field winding being adapted to act differentially with respect to each other and being connected in individual parallel circuit portions, with the parallel circuit portions connected in series with said armature to one side of said power circuit.

2. The combination in a regenerative system of a power circuit, a direct current dynamo-electric machine connected to operate as a generator and to deliver current to the power circuit, said dynamo-electric machine comprising an armature, a main series field winding and an auxiliary field winding, said main series field winding and said auxiliary field winding being adapted to act differentially with respect to each other and being connected in individual parallel circuit portions with the parallel circuit portions connected in series with said armature to one side of said power circuit, the circuit portion in which said main series field winding is connected having higher reactance than the circuit portion in which said auxiliary field winding is connected.

3. The combination in a regenerative system of a power circuit, a direct current dynamo-electric machine connected to operate as a generator and to deliver current to the power circuit, said dynamo-electric machine comprising an armature, a main series field winding and an auxiliary field winding, said main series field winding and said auxiliary field winding being adapted to act differentially with respect to each other and being connected in individual parallel circuit portions electrically interposed between said armature and one side of said power circuit, and means for retarding changes in the current in the circuit portion in which said main series field winding is connected in response to changes in the voltage impressed thereon.

4. The combination in a regenerative system of a power circuit, a direct current dynamo-electric machine connected to operate as a generator and to deliver current to the power circuit, said dynamo-electric machine comprising an armature, a main series field winding and an auxiliary field winding, said main series field winding and said auxiliary field winding being connected in individual parallel circuit portions electrically interposed between said armature and one side of said power circuit, and a source of voltage connected in the circuit portion in which said auxiliary field winding is connected.

5. The combination in a regenerative system of a power circuit, a direct current dynamo-electric machine connected to operate as a generator and to deliver current thereto, said dynamo-electric machine comprising an armature, a main series field winding and an auxiliary field winding, said main series field winding and said auxiliary field winding being connected in individual parallel circuit portions electrically interposed between said armature and one side of said power circuit, means for retarding changes in the current in the circuit portion in which said main series field winding is connected in response to changes in the voltage impressed thereon, and a source of voltage connected in the circuit portion in which said auxiliary field winding is connected.

6. The combination with a circuit, of a dynamo-electric machine adapted to operate as a generator and to deliver current thereto, said dynamo-electric machine comprising an armature, a main series field winding and an auxiliary field winding, said main series field winding and said auxiliary field winding being connected in individual parallel circuit portions electrically interposed between said armature and one side of said circuit, means comprising a reactance for retarding changes in the current in the circuit portion in which said main series field winding is connected in response to changes in the voltage impressed thereon, a source of voltage connected in the circuit portion in which said auxiliary field winding is connected, and a resistance in the first mentioned circuit portion.

7. The combination with a circuit, of a dynamo-electric machine adapted to operate as a generator and to deliver current thereto, said dynamo-electric machine comprising an armature, main series field winding and an auxiliary field winding, said main series field winding and said auxiliary field winding being connected in individual parallel circuit portions electrically interposed between said armature and one side of said circuit, and a source of voltage connected in the circuit portion in which said auxiliary field winding is connected in opposition to the voltage impressed thereon by said dynamo-electric machine, said auxiliary field winding being adapted to act differentially with respect to said main series field winding when traversed by current which is caused to flow therein when the voltage impressed upon said circuit portion exceeds the voltage of said source and to act accumulatively with respect to said main series field winding when traversed by current which is caused to flow therein when the voltage impressed upon said circuit portion is less than the voltage of said source.

8. The combination with a power circuit, of a dynamo-electric machine adapted to operate as a generator and to deliver current thereto, said dynamo-electric machine comprising an armature, a main series field winding and an auxiliary field winding, said main series field winding and said auxiliary field winding being connected in individual parallel circuit portions electrically interposed between said armature and one side of said circuit, means for retarding changes in the current in the circuit portion in which said main series field winding is connected in response to changes in the voltage impressed thereon, and a source of voltage connected in the circuit portion in which said auxiliary field winding is connected in opposition to the voltage impressed thereon by said dynamo-electric machine, said auxiliary field winding being adapted to act differentially with respect to said main series field winding when traversed by current which is caused to flow therein when the voltage impressed upon said second mentioned circuit portion exceeds the voltage of said source and to act accumulatively with respect to said main series field winding when traversed by current which is caused to flow therein when the voltage impressed upon said second mentioned circuit portion is less than the voltage of said source.

9. The combination with a power circuit, of a dynamo-electric machine adapted to operate as a generator and to deliver current thereto, said dynamo-electric machine comprising an armature, a main series field winding and an auxiliary field winding, said main series field winding and said auxiliary field winding being connected in individual parallel circuit portions electrically interposed between said armature and one side of said circuit, means for retarding changes in the current in the circuit portion in which said main series field winding is connected in response to changes in the voltage impressed thereon, a source of voltage connected in the circuit portion in which said auxiliary field winding is connected in opposition to the voltage impressed thereon by said dynamo-electric machine, said auxiliary field winding being adapted to act differentially with respect to said main series field winding when traversed by current which is caused to flow therein when the voltage impressed upon said second mentioned circuit portion exceeds the voltage of said source and to act accumulatively with respect to said main series field winding when traversed by current which is caused to flow therein when the voltage impressed upon said second mentioned circuit portion is less than the voltage of said source, and a resistance connected in said first mentioned circuit portion.

10. The combination with a circuit, of a dynamo-electric machine adapted to operate as a generator and to deliver current thereto, said dynamo-electric machine comprising an armature, a main series field winding and an auxiliary field winding, said main series field winding and said auxiliary field winding being connected in individual parallel circuit portions electrically interposed between said armature and one side of said circuit, and an exciter comprising a main field winding, an armature connected in the circuit portion in which said auxiliary field winding is connected, and an auxiliary field winding connected in series with the armature of said dynamo-electric machine and adapted to act differentially with respect to the main field winding of said exciter.

11. The combination with a circuit, of a dynamo-electric machine adapted to operate as a generator and to deliver current thereto, said dynamo-electric machine comprising an armature, a main series field winding and an auxiliary field winding, said main series field winding and said auxiliary field winding being connected in individual parallel circuit portions electrically interposed between said armature and one side of said circuit, means for retarding changes in the current in the circuit portion in which said main series field winding is connected in response to changes in the voltage impressed thereon, and an exciter comprising a main field winding, an armature connected in the circuit portion in which said auxiliary field winding is connected, and an auxiliary field winding connected in series with the armature of said dynamo-electric machine and adapted to act differentially with respect to the main field winding of said exciter, said exciter armature being adapted to develop a voltage in opposition to the voltage impressed upon the circuit portion in which it is connected by the dynamo-electric machine and when the voltage developed by the exciter is less than said impressed voltage to permit a portion of the current generated by said dynamo-electric machine to traverse the auxiliary field winding of the dynamo-electric machine and when the voltage developed by the exciter is greater than said impressed voltage to cause a current to traverse a local circuit comprising the main series field winding and the auxiliary field winding of said dynamo-electric machine, the auxiliary field winding of said dynamo-electric machine being adapted in the former case to act differentially and in the latter case to act accumulatively with respect to the main series field winding of said dynamo-electric machine.

12. The combination with the power circuit of a dynamo-electric machine adapted to be connected thereto and to operate alternatively either as a motor or as a generator, said dynamo-electric machine comprising an armature, a main series field winding and an auxiliary field winding, and means for connecting said armature in series with said main series field winding when it is desired to operate said dynamo-electric machine as a motor, and for reversing the armature connections of said main series field winding and connecting it in one circuit portion, connecting said auxiliary field winding in a second circuit portion, and connecting said circuit portion in parallel relation to each other between said armature and said power circuit when it is desired to operate said dynamo-electric machine as a generator, said auxiliary field winding being adapted to act differentially with respect to said main series field winding when traversed by current generated by said dynamo-electric machine.

13. The combination with a variable voltage power circuit of a dynamo-electric machine adapted to be connected thereto and to operate alternatively either as a motor or as a generator, said dynamo-electric machine comprising an armature, a main series field winding and an auxiliary field winding, a reactance, a source of voltage, and means for connecting said armature in series with said main series field winding when it is desired to operate said dynamo-electric machine as a motor, and for reversing the armature connections of said main series field winding and connecting it in series with said reactance in one circuit portion, connecting said auxiliary field winding in series with said source of voltage in a second circuit portion, and connecting said circuit portions in parallel with each other between said armature and said power circuit when it is desired to operate said dynamo-electric machine as a generator, said auxiliary field winding being adapted to act differentially with respect to said main series field winding when traversed by current generated by said dynamo-electric machine.

14. The combination with a variable voltage power circuit, of a dynamo-electric machine adapted to be connected thereto and to operate alternatively either as a motor or as a generator, said dynamo-electric machine comprising an armature, a main series field winding and an auxiliary field winding, a reactance, an exciter comprising an armature, a main field winding and an auxiliary field winding, means for varying the excitation of said exciter main field winding, and means for connecting the armature of said dynamo-electric machine in series with the main series field winding thereof and with the auxiliary field winding of said exciter when it is desired to operate said dynamo-electric machine as a motor, and for reversing the armature connections of the main series field winding of said dynamo-electric machine and connecting it in series with said reactance in one circuit portion, connecting the auxiliary field winding of said dynamo-electric machine in series with the armature of said exciter in a second circuit portion, and connecting said circuit portions in parallel relation to each other between the armature of said dynamo-electric machine and the auxiliary field winding of said exciter which is thereby connected in series with the armature of said dynamo-electric machine when it is desired to operate said dynamo-electric machine as a generator, the auxiliary field winding of said exciter being adapted to act differentially with respect to the main field winding thereof and the auxiliary field winding of said dynamo-electric machine being adapted to act differentially with respect to the main series field winding thereof when the dynamo-electric machine acts as a generator.

15. The combination with a variable voltage power circuit, of a dynamo-electric machine adapted to be connected thereto and to operate alternatively either as a motor or as a generator, said dynamo-electric machine comprising an armature, a main series field winding and an auxiliary field winding, a resistance, a reactance, an exciter comprising an armature, a main field winding and an auxiliary field winding, means for varying the excitation of said exciter main field winding, and means for connecting the armature of said dynamo-electric machine in series with the main series field winding thereof and with the auxiliary field winding of said exciter when it is desired to operate said dynamo-electric machine as a motor, and for reversing the armature connections of the main series field winding of said dynamo-electric machine and connecting it in series with said resistance and said reactance in one circuit portion, connecting the auxiliary field winding of said dynamo-electric machine in series with the armature of said exciter in a second circuit portion, and connecting said circuit portions in parallel relation to each other between the armature of said dynamo-electric machine and the auxiliary field winding of said exciter which is thereby connected in series with the armature of said dynamo-electric machine when it is desired to operate said dynamo-electric machine as a generator, the auxiliary field winding of said exciter being adapted to act differentially with respect to the main field winding thereof and the auxiliary field winding of said dynamo-electric machine being adapted to act differentially with respect to the main series field winding thereof when the dynamo-electric machine acts as a generator.

In witness whereof, I have hereunto set my hand this twentieth day of October, 1917.

PETER W. FORSBERG.